(12) United States Patent
Martini

(10) Patent No.: US 11,085,757 B2
(45) Date of Patent: Aug. 10, 2021

(54) APPARATUS AND METHOD FOR REALIZING A PRECISION MEASURING DEVICE

(71) Applicant: Elbo Controlli S.r.l., Meda MB (IT)

(72) Inventor: Fabrizio Martini, Meda MB (IT)

(73) Assignee: Elbo Controlli S.r.l., Meda MB (IT)

(*) Notice: Subject to any disclaimer, the term of this patent is extended or adjusted under 35 U.S.C. 154(b) by 0 days.

(21) Appl. No.: 16/812,312

(22) Filed: Mar. 8, 2020

(65) Prior Publication Data

US 2020/0300611 A1  Sep. 24, 2020

(30) Foreign Application Priority Data

Mar. 18, 2019 (IT) .................. 102019000003883

(51) Int. Cl.
*G01B 11/14* (2006.01)
*G01B 11/24* (2006.01)

(52) U.S. Cl.
CPC .............. *G01B 11/14* (2013.01); *G01B 11/24* (2013.01)

(58) Field of Classification Search
CPC .... G01B 11/14; G01B 11/24; G01D 5/24433; G01D 5/24442
See application file for complete search history.

(56) References Cited

U.S. PATENT DOCUMENTS

| 4,815,213 | A | 3/1989 | McCabe | |
|---|---|---|---|---|
| 2011/0032610 | A1* | 2/2011 | Naritake | G02B 21/34 |
| | | | | 359/391 |
| 2017/0341265 | A1* | 11/2017 | Kang | A47B 13/08 |

FOREIGN PATENT DOCUMENTS

| WO | 2006/109020 A1 | 10/2006 |
|---|---|---|
| WO | 2009/050470 A1 | 4/2009 |
| WO | 2013/053313 A1 | 4/2013 |

OTHER PUBLICATIONS

UIBM Search Report; Munich; dated Nov. 28, 2019.

* cited by examiner

*Primary Examiner* — Jonathan M Hansen
(74) *Attorney, Agent, or Firm* — Patshegen IP LLC; Moshe Pinchas

(57) ABSTRACT

Apparatus (A) for realizing a measuring device (D) includes workbench means (1) and a bearing structure (2) for at least a sliding operative head (4) with respect to said workbench means (1) on guide means (3) carried by said structure (2); said workbench means (1) having at least a flat surface (1a) on which a natural granite element (R) can be placed; on said element (R) a graduated glass plate (L) is being partially overlapped and firmly coupled and fixed to form the said measuring device (D).

9 Claims, 3 Drawing Sheets

APPARATUS AND METHOD FOR REALIZING A PRECISION MEASURING DEVICE

The invention herein relates to an apparatus for the realization of a measuring device.

Particularly, the invention herein is advantageously used to realize high-precision optical reading devices to use in the field of machine tools generally operating in the manufacturing and mechanical industry, especially during a measures check stage and in the preliminary adjustment of the tools, which the following description explicitly refers to without losing generally for this reason.

The aims of the invention herein are those to realize an apparatus and a related method by means of which high-precision measuring devices are obtained, that are thermal-stable and free of complex mechanical adjustments.

The structural and functional characteristics of the invention herein and its advantages in regards to the known state of the art will be clearer and more obvious from the following claims, and especially from an examination of the following description, referred to the attached drawings, that show a preferred but not limiting embodiment of an apparatus for the production of a measuring device, in which:

FIG. 1 schematically, in a front view, shows a preferred embodiment according to the invention herein.

Figure 4:
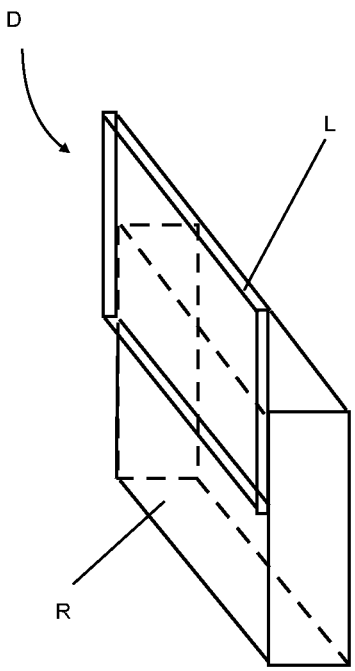

FIG. 4 in a perspective and with an enlarged scale shows a measuring device obtained with the apparatus herein.

With a particular reference to the attached figures from 1 to 4, with A an apparatus capable to realize a measuring device D (FIG. 4), especially an optical reading device, is globally referred to, to be advantageously used in the field of machine tools operating in the manufacturing and mechanical industry, preferably during the initial measuring check stages and in the preliminary adjustment of the tools.

The apparatus A includes a flat workbench 1 capable to define part of a frame (known and not shown) of the apparatus A commonly placed on the floor.

Figure 1:
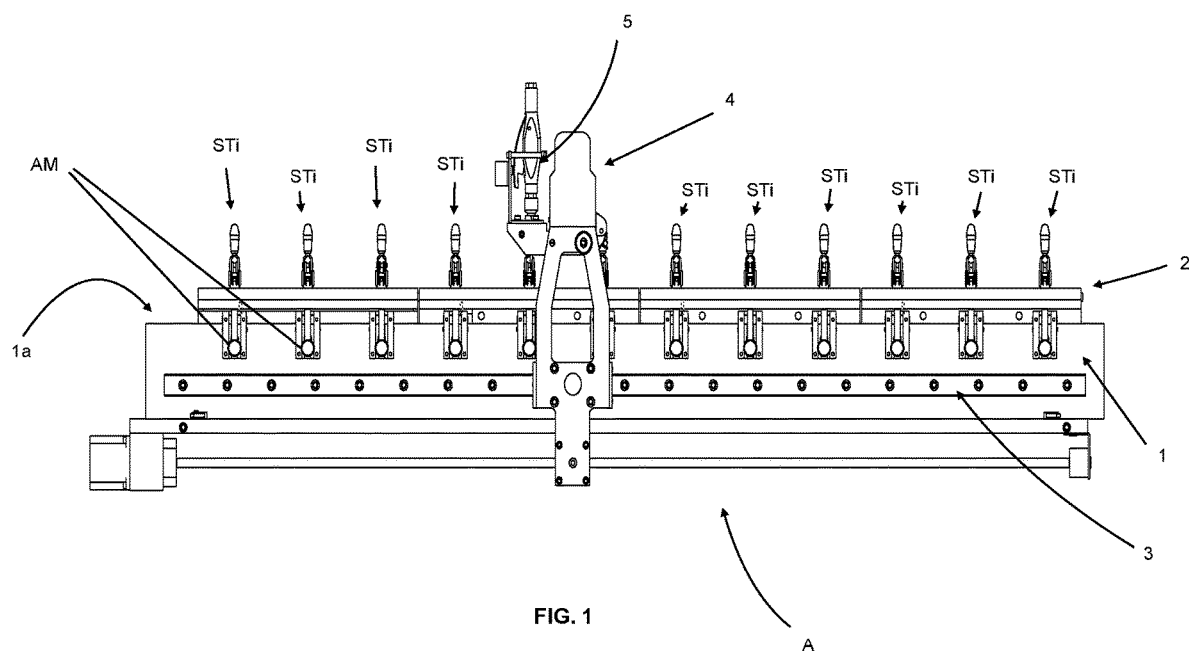
Figure 2:
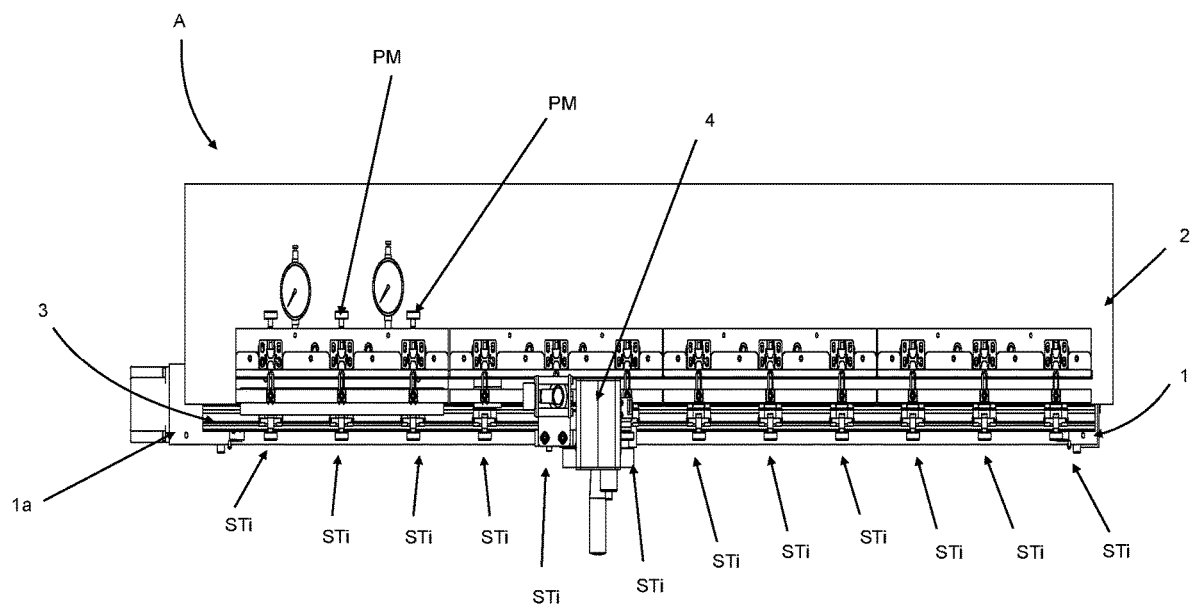
FIG. 2 shows in a plan view the apparatus of FIG. 1.
Figure 3:
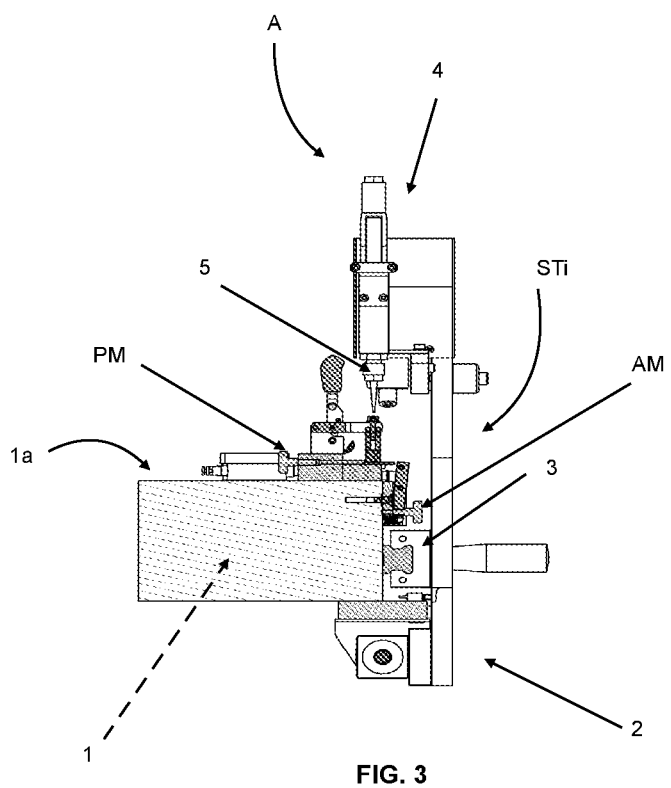
FIG. 3 is a side view, according to a vertical section A-A of the apparatus of the FIGS. 1 and 2.

According to the better illustrations of the FIGS. 1 and 3, the bench 1 is realized in a compact and rigid material, preferably stone materials or equivalents, and it is capable to carry an assembled metallic structure 2, essentially cantilevered over the upper flat surface 1a of the bench 1, supporting a plurality of alignment and adjustment stations STi (twelve stations shown in FIG. 1), that are each provided with adjustment means with moving or similar bars AM and rods PM, that are placed suitably spaced one from the other from the same bench 1.

Furthermore, the bench 1 can carry side assembled guide and linearly sliding means 3 for an operative moving head 4, manually or with the thrust of motor means (known and not shown), along the same guide means 3 and including at least a dispensing and application nozzle 5 composed of a fixing material, e.g. a suitable adhesive material.

In use the operation of the above-described apparatus A suitable for the realization of measuring devices D occurs according to the following operative methodology:

on the flat upper surface 1a of the bench 1 a bar or rule element R rectified specifically realized in natural granite "absolute black", that shows an optimum dimensional stability, perfect planarity characteristics is manually positioned;

by means of the various stations STi both the fixing of the rule R on the surface 1a and the optimum alignment and planarity of the same rule R relative to the bench 1 are manually performed;

as soon as the fixing and alignment stages of the rule R on the bench 1 are completed, the drive of the head 4 to dispense and distribute, on the whole upper surface of the rule R fixed to the bench 1 from the bars AM, a suitable quantity of fixing adhesive material is controlled;

an optical glass graduated plate L is partially applied overlapped on the rule R, aligned to the same at each single station STi, by means of the adjustment of the position of the mentioned moving rod means PM, which the glass graduated plate L is pressed against by the bars AM of each single station STi;

the correct position of the graduations of the plate L being monitored focussing on the working area with the moving head 4 suitably provided with check and displaying means with microscope/camera (known and not shown) and displayed on a suitable viewer/monitor (known and not shown) provided with optical goal; in this way the plate L to will be evenly pressed in order to distribute the adhesive material that, when polymerised (e.g. UV), will make the plate L firmly coupled with the same rule R, realizing in this way a precise measuring device D.

The firm coupling between the optical glass plate L and the natural granite, adjusted rule R is therefore suitable to obtain a high-compatible measuring device D from a thermal point of view, due to the fact that both the plate L and the rule R show almost identical thermal expansion coefficients ($\Delta T = 0.8\text{-}0.9 \times 10^{-5}$), perfectly planar and having a mechanical parallel optical graduation to the bearing surface and normal to the alignment surface.

The invention claimed is:

1. Apparatus for realizing a measuring device comprising workbench means and a support structure for holding at least one sliding operative head; wherein said sliding operative head is configured for sliding with respect to said workbench means on guide means carried by said structure; wherein said workbench means having at least one flat surface and a natural granite element placed on said flat surface; and a graduated glass plate being firmly coupled and fixed above said granite element and partially overlapped therwith to form said measuring device (D).

2. The apparatus according to claim 1, wherein said structure is adapted to support a plurality of stations provided with means for fixing, adjusting and aligning said element and said glass plate with respect to said workbench means.

3. The apparatus according to claim 1, wherein said structure is arranged substantially cantilevered above said workbench means.

4. The apparatus according to claim 1, wherein said operative head comprises means for delivering fixing material so as to fix the said element to the said plate, and displaying means for check the correct position of said plate on said element.

5. The apparatus according to claim 1, wherein the said element and the said plate have substantially the same thermal expansion coefficient.

6. The apparatus according to claim 1, wherein said workbench means are made of stone or equivalent material.

7. Method for realizing a measuring device, the method comprising:

placing a granite element on rigid flat support workbench means;

applying a fixing material on said element; and affixing with said fixing material a graduated glass plate on top said element such that said glass plate overlaps with said element to form said measuring device.

8. The method according to claim 7, wherein said fixing comprises a polymerization step of the said fixing material.

9. The method according to claim 7, wherein said element and said plate coupled together have substantially the same thermal expansion coefficient.

* * * * *